United States Patent
Meier et al.

(10) Patent No.: US 6,393,555 B1
(45) Date of Patent: May 21, 2002

(54) RAPID EXECUTION OF FCMOV FOLLOWING FCOMI BY STORING COMPARISON RESULT IN TEMPORARY REGISTER IN FLOATING POINT UNIT

(75) Inventors: Stephan G. Meier, Sunnyvale; Norbert Juffa; Frederick D. Weber, both of San Jose; Stuart F. Oberman, Sunnyvale, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/370,787

(22) Filed: Aug. 5, 1999

(51) Int. Cl.[7] .................................................. G06F 9/30
(52) U.S. Cl. ........................ 712/222; 712/32; 712/34; 712/217; 712/225
(58) Field of Search ........................... 712/32, 222, 34, 712/217, 225

(56) References Cited

U.S. PATENT DOCUMENTS 5,889,984 A * 3/1999 Mills .......................... 712/225
5,991,874 A * 11/1999 Mills et al. ................. 712/300

OTHER PUBLICATIONS

*Intel Architecture Software Developer's Manual*, vol. 2: Instruction Set Reference, 1997, Chapter 3, pp. 105–114 and pp. 178–182.

* cited by examiner

*Primary Examiner*—Kenneth S. Kim
(74) *Attorney, Agent, or Firm*—Conley, Rose & Tayon, PC; B. Noël Kivlin

(57) ABSTRACT

A microprocessor with a floating point unit configured to rapidly execute floating point compare (FCOMI) type instructions that are followed by floating point conditional move (FCMOV) type instructions is disclosed. FCOMI-type instructions, which normally store their results to integer status flag registers, are modified to store a copy of their results to a temporary register located within the floating point unit. If an FCMOV-type instruction is detected following an FCOMI-type instruction, then the FCMOV-type instruction's source for flag information is changed from the integer flag register to the temporary register. FCMOV-type instructions are thereby able to execute earlier because they need not wait for the integer flags to be read from the integer portion of the microprocessor. A computer system and method for rapidly executing FCOMI-type instructions followed by FCMOV-type instructions are also disclosed.

20 Claims, 6 Drawing Sheets

RAPID EXECUTION OF FCMOV FOLLOWING FCOMI BY STORING COMPARISON RESULT IN TEMPORARY REGISTER IN FLOATING POINT UNIT

BACKGROUND OF THE INVENTION

1. Field of the Invention

This invention relates generally to the field of microprocessors and, more particularly, to the execution of floating point compare operations in a floating point coprocessor.

2. Description of the Related Art

Most microprocessors must support multiple data types. For example, x86-compatible microprocessors must execute two types of instructions; one set defined to operate on integer data types, and a second set defined to operate on floating point data types. In contrast with integers, floating point numbers have fractional components and are typically represented in exponent-significand format. For example, the values $2.15H10^3$ and $-10.5$ are floating point numbers while the numbers $-1$, 0, and 7 are integers. The term "floating point" is derived from the fact that there is no fixed number of digits before or after the decimal point, i.e., the decimal point can float. Using the same number of bits, the floating point format can represent numbers within a much larger range than integer format. For example, a 32-bit signed integer can represent the integers between $-2^{31}$ and $2^{31}-1$ (using two's complement format). In contrast, a 32-bit ("single precision") floating point number as defined by the Institute of Electrical and Electronic Engineers (IEEE) Standard 754 has a range (in normalized format) from $2^{-126}$ to $2^{127} \times (2-2^{-23})$ in both positive and negative numbers.

FIG. 1 illustrates an exemplary format for an 8-bit integer 100. As the figure illustrates, negative integers are represented using the two's complement format 106. To negate an integer, all bits are inverted to obtain the one's complement format 102. A constant 104 of one is then added to the least significant bit (LSB).

FIG. 2 shows an exemplary format for a floating point value. Value 110 is a 32-bit (single precision) floating point number. Value 110 is represented by a significand 112 (23 bits), a biased exponent 114 (8 bits), and a sign bit 116. The base for the floating point number (2 in this case) is raised to the power of the exponent and multiplied by the significand to arrive at the number represented. In microprocessors, base 2 is most common. The significand comprises a number of bits used to represent the most significant digits of the number. Typically, the significand comprises one bit to the left of the radix point and the remaining bits to the right of the radix point. A number in this form is said to be "normalized". In order to save space, in some formats the bit to the left of the radix point, known as the integer bit, is not explicitly stored. Instead, it is implied in the format of the number.

Floating point values may also be represented in 64-bit (double precision) or 80-bit (extended precision) format. As with the single precision format, a double precision format value is represented by a significand (52 bits), a biased exponent (11 bits), and a sign bit. An extended precision format value is represented by a significand (64 bits), a biased exponent (15 bits), and a sign bit. However, unlike the other formats, the significand in extended precision includes an explicit integer bit. Additional information regarding floating point number formats may be obtained in IEEE Standard 754.

The recent increased demand for graphics-intensive applications (e.g., 3D games and virtual reality programs) has placed greater emphasis on a microprocessor's floating point performance. Given the vast amount of software available for x86 microprocessors, there is particularly high demand for x86-compatible microprocessors having high performance floating point units. Thus, microprocessor designers are continually seeking new ways to improve the floating point performance of x86-compatible microprocessors.

One technique used by microprocessor designers to improve the performance of all floating point instructions is pipelining. In a pipelined microprocessor, the microprocessor begins executing a second instruction before the first has been completed. Thus, several instructions are in the pipeline simultaneously, each at a different processing stage. The pipeline is divided into a number of pipeline stages, and each stage can execute its operation concurrently with the other stages. When a stage completes an operation, it passes the result to the next stage in the pipeline and fetches the next operation from the preceding stage. The final results of each instruction emerge at the end of the pipeline in rapid succession.

Another popular technique used to improve floating point performance is out-of-order execution. Out-of-order execution involves reordering the instructions being executed (to the extent allowed by dependencies) so as to keep as many of the microprocessor's floating point execution units as busy as possible. As us ed herein, a microprocessor may have a number of execution units (also called functional units), each optimized to perform a particular task or set of tasks. For example, one execution unit may be optimized to perform integer addition, while another execution unit may be configured to perform floating point addition.

Typical pipeline stages in a modem microprocessor include fetching, decoding, address generation, scheduling, execution, and retiring. Fetching entails loading the instruction from the instruction cache. Decoding involves examining the fetched instruction to determine how large it is, whether or not it requires an access to memory to read data for execution, etc. Address generation involves calculating memory addresses for instructions that access memory. Scheduling involves the task of determining which instructions are available to be executed and then conveying those instructions and their associated data to the appropriate execution units. The execution stage actually executes the instructions based on information provided by the earlier stages. After the instruction is executed, the results produced are written back either to an internal register or the system memory during the retire stage.

Yet another method used by designers to improve performance and simplify the design of the microprocessor is to logically separate the floating point portions of the microprocessor from the integer portions. In this configuration, the floating point portions of the microprocessor are referred to as a floating point coprocessor or floating point unit (FPU), even though it is typically implement ed on the same silicon substrate as the microprocessor. If a floating point instruction is detected by the microprocessor, the instruction is handed off to the floating point coprocessor for execution. The coprocessor then executes the instruction independently from the rest of the microprocessor. Since the floating point coprocessor has its own set of registers, this technique works well for most floating point instructions. However, there are some floating point instructions that interface with the integer side of the microprocessor. For example, the instructions FCOMI, FCOMIP, FUCOMI, and FUCOMIP (collectively referred to herein as "FCOMI-type" instructions) perform floating point compare operations and then set certain integer flags (i.e., flags in the integer EFLAGS register). After executing FCOMI-type instructions, the coprocessor is configured to convey the results to the integer portions of the microprocessor for storage in the EFLAGS register. The extra step of conveying the results to the integer side for storage normally does not inhibit performance significantly.

However, in many cases FCOMI-type instructions are followed by FCMOV (floating point conditional move) type instructions. As used herein, FCMOV-type instructions include all floating point instructions that perform conditional moves based upon one or more integer flags. FCMOV-type instructions test the flags in the EFLAGS register and then perform a move operation if a specified test condition is true (e.g., if the zero flag is set). The FCMOV-type instruction is dependent upon the results of the FCOMI-type instruction, and therefore cannot be scheduled to execute until the desired flags are read back from the integer EFLAGS register.

In some current coprocessor implementations, executing an FCOMI-type instruction followed by an FCMOV-type instruction creates a significant delay as the flags are sent to the integer side and then read back. For example, some coprocessor configurations are limited to passing values using the microprocessor's instruction cache or data cache. This involves the time consuming process of clearing out a line in the cache, storing the information, signaling its availability to the coprocessor, and then reading the flags into the coprocessor. This delay in scheduling the FCMOV-type instruction may stall the coprocessor pipeline and may negatively impact performance.

Since modem compilers often generate x86 code that contains FCOMI-type/FCMOV-type instruction sequences to avoid branches, accelerating this code sequence is particularly desirable. Thus, an efficient system and method for rapidly executing FCOMI-type/FCMOV-type instruction sequences is needed.

SUMMARY

The problems outlined above may at least in part be solved by a microprocessor configured to rapidly execute FCOMI-type instructions that are immediately followed by FCMOV-type instructions. The microprocessor may rapidly execute these instructions by utilizing a temporary floating point register to store the result flags from the FCOMI-type instructions. The temporary register is then used to provide the FCMOV-type instruction with the condition flags. Since the temporary register is local to the floating point coprocessor, in some embodiments this configuration may eliminate much of the delay associated with waiting for the result flags to be conveyed to the integer side and then reading them back again.

Depending upon the implementation, an FCMOV-type instruction "immediately" follows an FCOMI-type instruction if one of the following conditions are true:

(a) No integer instructions occur between the FCOMI-type instruction and the FCMOV-type instruction;

(b) No EFLAGs-altering integer instructions occur between the FCOMI-type instruction and the FCMOV-type instruction;

(c) No integer instructions that change the zero flag, parity flag, or carry flag occur between the FCOMI-type instruction and the FCMOV-type instruction (this is explained in greater detail below);

(d) No instructions that use the Ftemp register (explained in greater detail below) occur between the FCOMI-type instruction and the FCMOV-type instruction (this may be enforced by preventing Ftmep from being used by any instructions other than FCOMI-type instructions or FCMOV-type instructions); or (e) Combinations of (b) and (d) or (c) and (d).

Some embodiments may only check for condition (a), while other embodiments may utilize more elaborate schemes to check for condition (d).

In some embodiments, an FCMOV-type instruction "immediately" follows an FCOMI-type instruction if there are no intervening integer instructions that can change the microprocessor's integer EFLAGS register. For example, in the following code sequence, the FCMOV-type instruction is said to immediately follow the FCOMI-type instruction:

FCOMI [MEM]
FSQRT
FCMOV BX

The FCMOV instruction is said to immediately follow the FCOMI [MEM] instruction because the FSQRT instruction will have no effect on the EFLAGS register. Additional conditions may also be used (e.g., no intervening integer instructions, regardless of whether they can change the EFLAGS register).

Generally speaking, in one embodiment a microprocessor configured to rapidly execute FCOMI-type instructions immediately followed by FCMOV-type instructions will include an instruction cache and a floating point unit. The instruction cache is configured to store both floating point instructions and integer instructions. The floating point unit is coupled to receive the floating point instructions from the instruction cache. The floating point unit may include a mechanism for detecting floating point conditional move (FCMOV) type instructions that immediately follow floating point compare (FCOMI) type instructions that rely on integer flags. The floating point unit may also include a temporary storage register configured to store results from the FCOMI-type instructions. The floating point unit may further include a mechanism for forcing the FCMOV-type instructions to use the temporary storage register as a source for flag information in lieu of the integer flags registers. Examples of such mechanisms include rename units (described in greater detail below), control logic, and functional units within the floating point coprocessor.

In some embodiments, the FCMOV-type instructions are configured to not use the temporary storage registers as a source for flag information if one or more integer instructions occur between the FCMOV-type instruction and the FCOMI-type instruction. As noted above, other possible considerations include: (i) whether any intervening instructions also use the temporary register, and (ii) whether any intervening integer instructions capable of altering the integer flags have occurred.

A method for rapidly executing FCOMI-type instructions immediately followed by FCMOV-type instructions in a microprocessor is also contemplated. Generally speaking, in one embodiment the method includes storing the results of FCOMI-type instructions to a temporary destination register, and then assigning the FCMOV-type instructions the temporary floating point register as a source. The results from the FCOMI-type instructions may be stored in parallel to both an integer flag register and the temporary floating point register. Depending upon the implementation, this may advantageously reduce the time traditionally needed for the write to and read-back from the integer flag register. As previously noted, a particular FCMOV-type instruction may be said to immediately follow a particular FCOMI-type instruction if: (i) there are no integer instructions between the particular FCMOV-type instruction and the particular FCOMI-type instruction, (ii) there are no instructions between the particular FCMOV-type instruction and the particular FCOMI-type instruction that have an ability to change the integer flag register, and (iii) there are no instructions between the particular FCMOV-type instruction and the particular FCOMI-type instruction that have an ability to change the temporary register. In other embodiments one or two of the above criteria may be selected in lieu of using all three.

A computer system configured to rapidly execute FCOMI-type instructions immediately followed by FCMOV-type instructions is also contemplated. In one embodiment, the computer system may comprise a system memory, a communications device for transmitting and receiving data across a network, and one or more microprocessors coupled to the memory and the communications device. The microprocessors may advantageously be configured as described above.

BRIEF DESCRIPTION OF THE DRAWINGS

Other objects and advantages of the invention will become apparent upon reading the following detailed description and upon reference to the accompanying drawings.

Figures 1, 2:
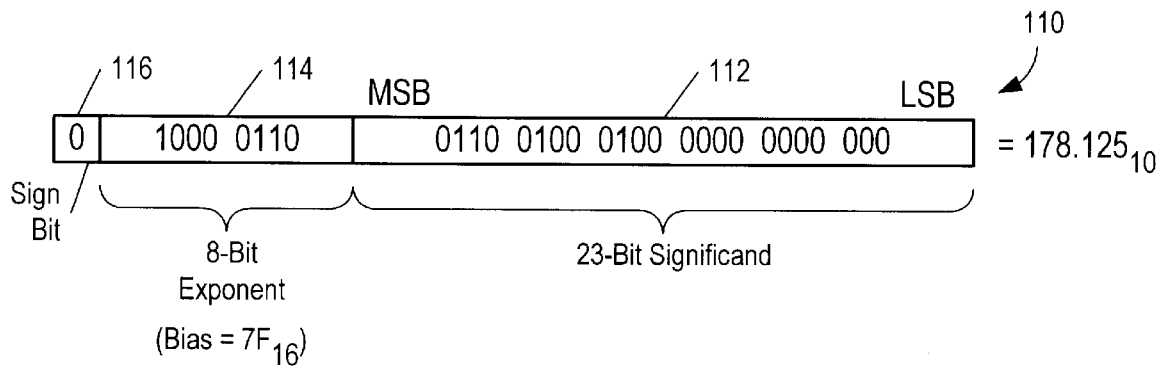
FIG. 1 illustrates an exemplary format for an integer.
FIG. 2 shows an exemplary format for a floating point value.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Figure 3:
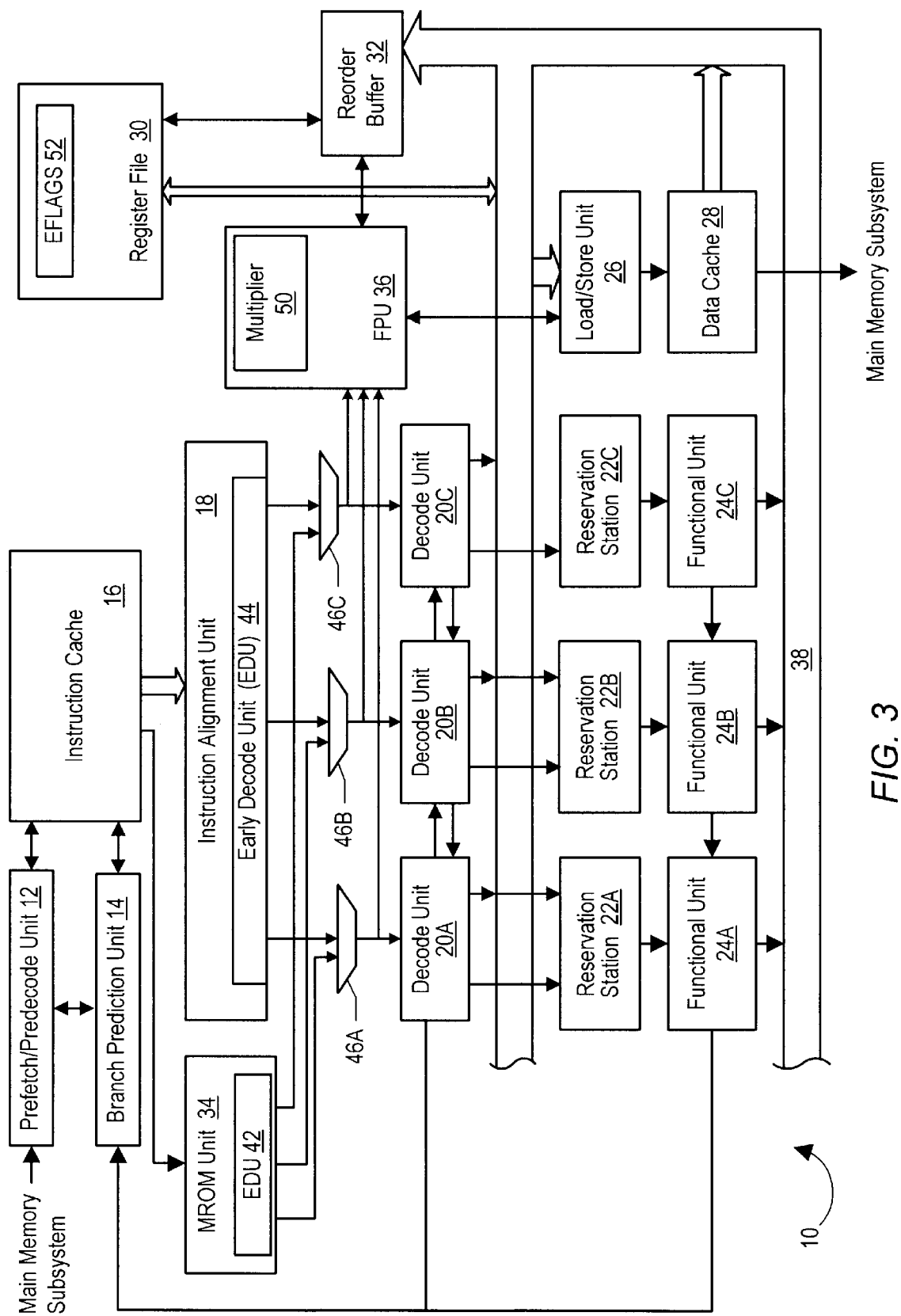
FIG. 3 is a block diagram of one embodiment of an exemplary microprocessor.

Example Microprocessor—FIG. 3

Turning now to FIG. 3, a block diagram of one embodiment of a microprocessor 10 is shown. As used herein the term "microprocessor" may refer to x86 compatible microprocessors, other microprocessors (e.g., RISC, VLIW), digital signal processors, micro-controllers, and other embedded and or integrated control and calculation devices. Additional embodiments are possible and contemplated.

This embodiment of microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36, which in turn comprises multiplier 50. Before examining in detail one embodiment of FPU 36 that rapidly executes FCOMI-type instructions immediately followed by FCMOV-type instructions, the operation of microprocessor 10 will be briefly discussed. Note that elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42, is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64-byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 may predict the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will now be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate data byte would have start, end, and functional bits as follows:

| Start bits | 10000 |
|---|---|
| End bits | 00001 |
| Functional bits | 11000 |

According to one particular embodiment, early identification that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod RIM byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 may employ branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction. These units may also begin the process of loading the desired operands from memory (if necessary). Early decode units 42–44 may also be configured to detect and route floating point instructions to the floating point unit 36. Early decode units 42–44 may also signal FPU 36 when integer instructions have been detected. This signal may be used by FPU 36 to determine whether any intervening integer instructions have occurred between a particular FCOMI-type instruction and a following FCMOV-type instruction.

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (floating point, MMX, and 3DX instructions). In one embodiment of microprocessor 10, up to three floating point/MMX/3DX instructions per clock cycle may be conveyed to floating point unit 36. As note above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 3, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position I is formed by reservation station 22B and functional unit 24B; and issue position 2 is formed by reservation station 22C and functional unit 24C.

His Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). EFLAGS register 52 may also be implemented as part of register file 30. In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 4:
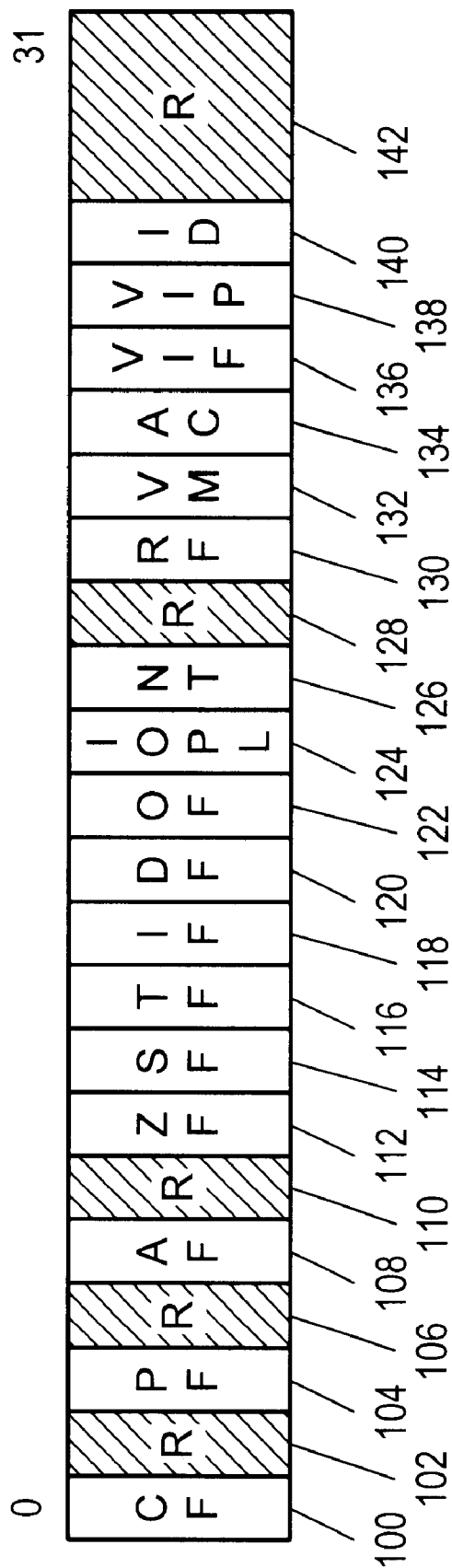
FIG. 4 is a diagram of one embodiment of an x86 compatible integer flag (EFLAGS) register.

EFLAGS Register—FIG. 4

FIG. 4 is a diagram illustrating one embodiment of EFLAGS register 30. Carry flag (CF) 100 is set if an operation generates a carry or borrow out, and may be used to indicate an overflow for unsigned integer arithmetic operations. Flags 102, 106, 100, 128, and 142 are reserved for the microprocessor's internal use. Parity flag (PF) 104 is set if the least significant byte of a result contains an even number of asserted bits. Auxiliary carry flag (AF) 108 is used in binary coded decimal (BCD) operations to indicate a carry out of the third least significant bit of the result. Zero flag (ZF) 112 is set if the result of an operation is zero. Sign flag (SF) 114 is set to equal the sign bit of signed integer results. Trap flag (TF) 116 is set to enable stepping debug mode. Interrupt Enable flag (IF) 118 is set to enable the microprocessor to respond to maskable interrupts. Direction flag (DF) 120 indicates whether string instructions (e.g., store string STOS) auto-increment or auto-decrement. Overflow flag (OF) 122 is set to indicate whether the result is too large or too small to fit within the designated format. I/O privilege level (IOPL) flag 124 is two bits in length and indicates the privilege level of the current task. Nested task (NT) flag 126 controls the chaining of interrupted and called tasks. Resume flag (RF) 130 indicates how the microprocessor will respond to debugging exceptions. Virtual mode (VM) flag 132 indicates whether virtual 386 mode is currently enabled. Alignment check (AC) flag 134 works in cooperation with the CR0 register to enable or disable alignment checking of memory references. Virtual interrupt flag (VIF) 136 and virtual interrupt pending flag (VIP) 138 are used together to indicate pending interrupts. Identification flag (ID) 140 is used to indicate whether the microprocessor supports the CPUID instruction.

FCOMI-type instructions compare the top of the floating point register stack with a specified floating point register operand. According to the x86 architecture, FCOMI-type instructions set or clear the following status flags (depending on the results of the comparison and the opcode used for the FCOMI-type instruction): carry flag 100, parity flag 104, and zero flag 112. FCMOV-type instructions perform conditional move operations between the top of the R2 floating point register stack and a specified floating point register operand. The move operation is conditioned upon the state of one or more of the following flags: carry flag 100, parity flag 104, and zero flag 112 (i.e., the same flags set by the FCOMI-type instruction). Depending upon the opcode used to implement the FCMOV-type instruction, the move may conditioned upon one or more of the specified flags being set or cleared.

More information regarding the exact operation of FCOMI-type instructions, FCMOV-type instructions, and the EFLAGS register in the x86 architecture is available in the 1999 Intel Architecture Software Developer's Manual, Volume 2: Instruction Set Reference, available from the Intel Corporation (order number 243192).

Figure 5:
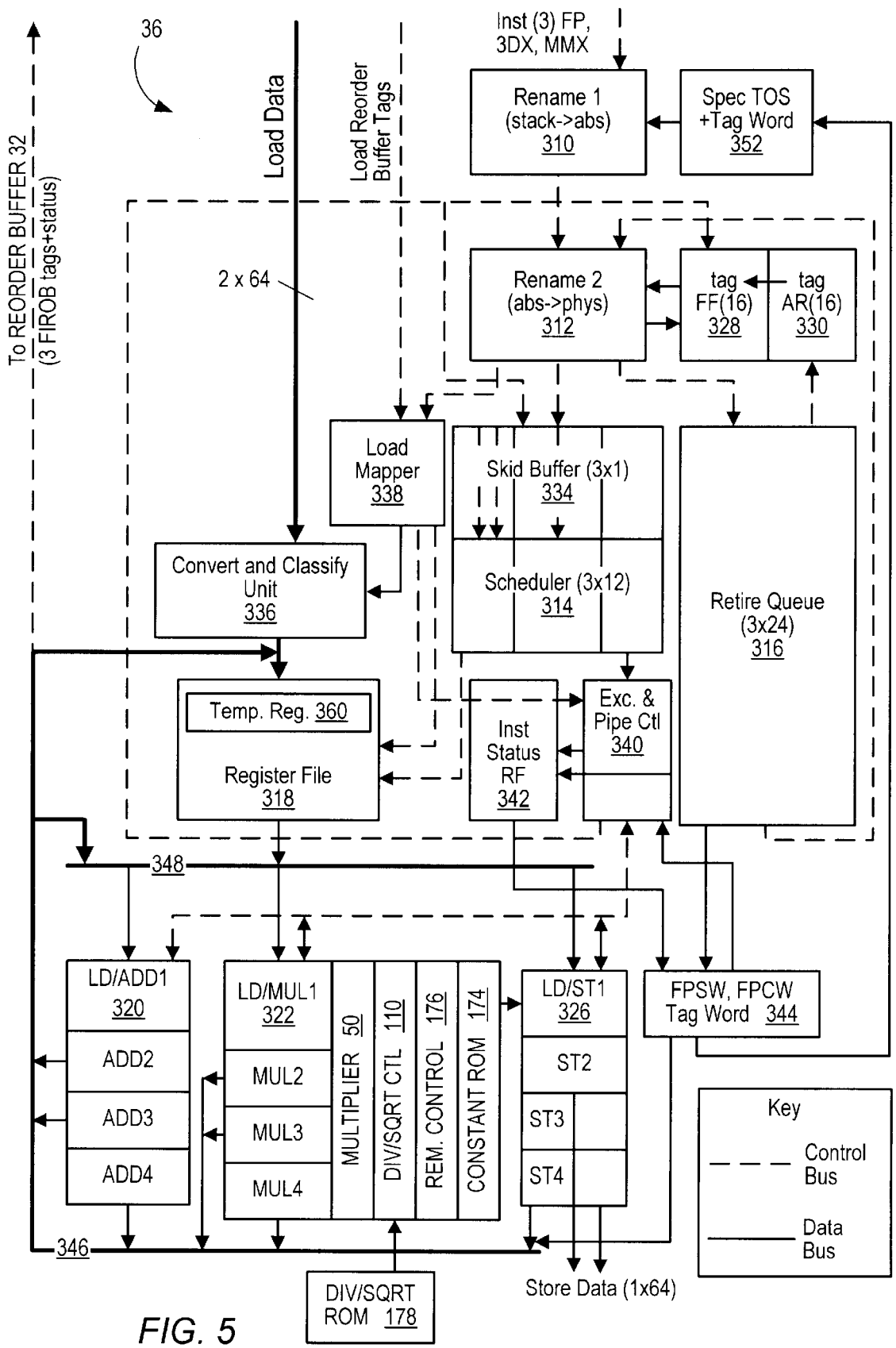
FIG. 5 is a block diagram of one embodiment of the floating point unit from FIG. 3.

Example Floating Point Unit—FIG. 5

Turning now to FIG. 5, details of one embodiment of FPU 36 are shown. Other embodiments are possible and contemplated. FPU 36 is a high performance out-of-order execution unit capable of accepting up to three new instructions per clock cycle. The three instructions may be any combination of x86 floating point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add instruction pipeline 320, a load/multiply instruction pipeline 322, a load/store instruction pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipe control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to instruction pipes 320, 322, and 326. Finally, instruction pipes 320, 322, and 326, and floating point status/control/tag words 344 are all coupled to result bus 346. While floating point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipe control unit 340, or retire queue 316.

Rename-1 unit 310 receives up to three instructions per clock cycle. As previously noted, these may be any combination of floating point, MMX, or 3DX instructions. Rename-1 unit 310 converts stack-relative register operands into absolute register operands. The x86 instruction set and architecture defines eight floating point registers that are accessed in a stack-like manner (i.e., relative to a top-of-stack pointer). For instructions with memory operands, e.g., FLD instructions (floating point load) a designated destination register can be assigned. Rename-1 unit 310 also assigns each instruction to one of three instruction pipelines, either load/store pipeline 326, add pipeline 320, or multiply pipeline 322.

Rename-2 unit 312 performs true register renaming. Upon receiving the instructions from rename-1 unit 310, rename-2 unit 312 reads three register tags from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Note, of the sixteen registers that define FPU 36's state (architectural or speculative), eight are architectural registers (i.e., floating point stack or MMX registers) and eight are micro-architectural registers (i.e., registers that store internal state information that is not generally accessible to the programmer). Register file 318 may also include temporary register 360. The old destination register tags are then read from the tag future file 328 and written to the tail of the free list. Finally, tag future file 328 is updated by storing tags for the new destination registers.

Memory operands may be handled by assigning them the same register tag as the destination register. This is because load data will be converted and directly written into the destination register when it is received from load/store pipeline 326. In the case of an FLD instruction (i.e., a floating point load instruction), no further execution is required, although the FLD instruction is still assigned to an execution pipeline for the purpose of handling exceptions and signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Concurrently with allocating the line of storage and snooping, retire queue 316 allocates one entry for each instruction. The entries store the destination register tags, the absolute destination register number, and the old destination register number. Additional information may also be included, e.g., information that may be needed to update the architectural state at retire time.

On the cycle following their entry into scheduler 314, the instructions are available for scheduling. Scheduler 314 (also referred to herein as schedule unit 314) examines all of the stored instructions and issues the oldest instructions which meet the following criteria: (1) the instruction pipe to which the instruction has been assigned is available, (2) the result bus for that instruction pipe will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. As used herein, scheduling refers to conveying instructions from the scheduler to their corresponding execution pipelines. Each of the three instruction pipes 320, 322, and 326 may accept a new instruction every clock cycle. Other embodiments capable of scheduling four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding. Result forwarding involves conveying the results from a recently executed instruction directly to other instructions that depend upon that result. Using result forwarding allows the result to be used in subsequent instructions without having to wait for the result to be stored in a register and then read from the same register.

Each instruction execution pipe 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each instruction pipe may begin performing the appropriate computation.

In the embodiment shown in the figure, instruction pipe 320 is configured to perform load and addition operations, instruction pipe 322 is configured to perform load and multiplication operations, and instruction pipe 326 is configured to perform load and store operations. Both instruction pipes 320 and 322 may be configured to perform certain MMX instructions. Instruction pipe 322, which comprises multiplier 50, may also be configured to perform iterative calculations that involve multiplication, e.g., reciprocal operations, division operations, and square root operations, under the control of control unit 110, division/square root ROM 178, and, if a remainder is called for, remainder control unit 176. Constant ROM 174 is a read only memory configured to store a plurality of constants for instructions such as FLDPI (load constant), for transcendental computations, for self-checking, and for certain special and exceptional results. Division/square root ROM 178 is a read only memory which stores constants used to determine initial values for division and square root computations and constants returned by certain 3DNow! instructions. Control unit 110 provides sequence information for division and square root functions. Note, in some embodiments control unit 110 may be part of execution and pipe control unit 340.

In some cases, instruction operands or the results generated by executing an instruction may be too small to fit within the operand or result's standard data format. These numbers are referred to as "denormals". While normalized floating point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denormal results generated by during execution within instruction pipes 320, 322, and 326 are tagged when they are generated. Execution and pipe control unit 340 detects the presence of the denormal tags and calls an appropriate microcode routine from MROM 34 to handle the denormal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the typical characteristics of each data type for x86 compatible floating point units (wherein "x" represents either a one or a zero):

| Sign | Exponent | Significand | Value |
|------|----------|-------------|-------|
| x | $00 \ldots 00_2$ | $0.00 \ldots 00_2$ | Zero |
| x | $11 \ldots 11_2$ | $1.00 \ldots 00_2$ | Infinity |
| x | $11 \ldots 11_2$ | $1.1xx \ldots xx_2$ | QNaN |
| x | $11 \ldots 11_2$ | $1.0xx \ldots xx_2$ | SNaN |
| x | $00 \ldots 00_2$ | $0.xx \ldots xx_2$ | Denormal |

MMX data types are 64 bits wide and comprise either eight packed 8-bit bytes, four packed 16-bit words, or two packed 32-bit double-words. MMX data types may be detected by the MMX opcodes which precede them. Normal data types are standard floating point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significand in the format (f.ff . . . ff) of 0.11 . . . 11 is an unsupported value. Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significand portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed in parallel to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a data register tag. The data register tag indicates which data register within register file 318 the corresponding data is to be loaded into.

Execution and pipe control unit 340 tracks the status of each stage in instruction pipes 320, 322, and 326. Execution and pipe control unit 340 contains timing information enabling it to determine the future availability of each instruction pipe. For example, when an FMUL (floating point multiply) instruction begins execution in multiplication instruction pipe 322, control unit 340 uses its stored timing information to notify scheduler 314 that the result will be available for output on result bus 346 four clock cycles later. This timing information allows scheduler 314 to efficiently schedule instruction for execution in instruction pipes 320, 322, and 326. Control unit 320 also tracks the status of each pipe stage, receiving and prioritizing exceptions from instruction pipes 320, 322, and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 of them store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipe control unit 340. As a result of instructions executing out of order in FPU 36, exceptions that occur within instruction pipes may need to be stored until the instructions generating them are the next to be retired. Retire queue 316 reads instruction status register file 342 when it retires instructions and updates the architectural floating point status word (FPSW) and floating point control word (FPCW) and tag word (collectively, 344) accordingly. This information is conveyed to rename-1 unit along with the current speculative top of stack 352 and on result bus 346.

Figure 6:
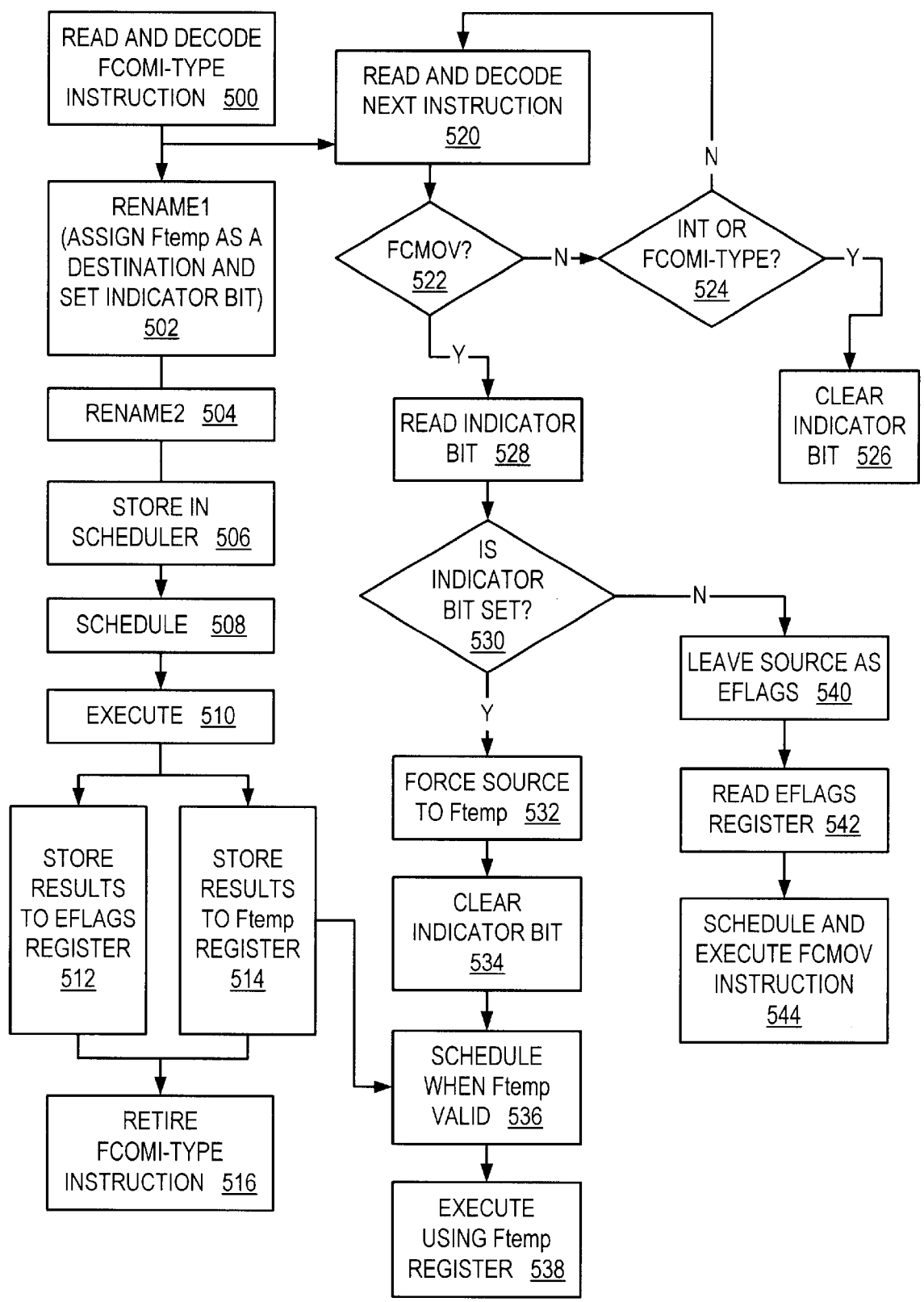
FIG. 6 is a flowchart of one embodiment of a method for rapidly executing FCOMI-type instructions immediately followed by FCMOV-type instructions.

Method for Rapidly Executing FCOMI-type/FCMOV-type Instructions—FIG. 6

FIG. 6 is a flowchart illustrating one embodiment of a method for rapidly executing FCMOV-type instructions that are immediately preceded by FCOMI-type instructions. First, the floating point unit receives an FCOMI-type instruction (step 500). Once received, the FCOMI-type instruction enters rename1 unit 310 and is assigned temporary register 360 (also referred to herein as the "Ftemp" register) as a destination (step 512). In addition, rename1 unit 310 may also be configured to set a corresponding indicator bit. The indicator indicates whether an FCOMI-type instruction bypass is underway. A "bypass" occurs when the FCMOV-type instruction bypasses the EFLAGS register in favor of the Ftemp register 360. The FCMOV-type instruction then proceeds to rename2 unit 312 (step 504) and the scheduler (step 506). When the FCOMI-type instruction is the oldest eligible instruction that is ready to be executed, the scheduler schedules the instruction for execution (step 508). The FCOMI-type instruction is then executed by one of execution pipes 320, 322, or 326 (step 510). The results are stored to EFLAGS register 52 (step 512) and Ftemp register 360 (step 514) as the FCOMI-type instruction is retired (step 516). In some embodiments, the FCOMI-type instructions may be forced to a particular execution pipeline (e.g., pipe 320) to simplify the underlying hardware, while in other embodiments the FCOMI-type instructions may be routed to any of the execution pipelines.

The next instruction is read and decoded (step 520). Early decode units 42 and 44 and or rename1 unit 310 may be configured to detect whether the instruction is an FCMOV-type instruction (step 522). If the instruction is not an FCMOV-type instruction, units 42, 44, and 310 may be configured to determine if the instruction is one that may alter the contents of the EFLAGS register (step 524). As previously noted, most integer instructions and additional FCOMI-type instructions may alter the contents of the EFLAGS register. If an EFLAGS-altering instruction is detected, the indicator bit is cleared (step 526). This indicates to following FCMOV-type instructions that an intervening instruction may change the contents of the EFLAGS register, and thus the contents of Ftemp register 360 should not be used as a source for flag information. If an EFLAGS-altering instruction is not detected, then the indicator bit remains set and the next instruction is read and decoded. In other embodiments, any intervening integer instruction may cause the indicator to be reset regardless of whether the instruction is capable of altering the EFLAGS register. As previously noted, in other embodiments step 526 may involve detecting if one of the following conditions are true:

(a) No integer instructions occur between the FCOMI-type instruction and the FCMOV-type instruction;

(b) No EFLAGs-altering integer instructions occur between the FCOMI-type instruction and the FCMOV-type instruction;

(c) No integer instructions that change the zero flag, parity flag, or carry flag occur between the FCOMI-type instruction and the FCMOV-type instruction (this is explained in greater detail below);

(d) No instructions that use the Ftemp register (explained in greater detail below) occur between the FCOMI-type instruction and the FCMOV-type instruction (this may be enforced by preventing Ftmep from being used by any instructions other than FCOMI-type instructions or FCMOV-type instructions); or (e) Combinations of (b) and (d) or (c) and (d).

In some embodiments, early decode units 42 and 44 and rename1 unit 310 may also be configured to detect other instructions that use Ftemp register 360. For example, in some embodiments of microprocessor 10, other instructions may also benefit from using Ftemp register 360 for bypassing (e.g., FCOM/FSTSW instruction sequences). Upon detecting these instructions, the indicator bit may be reset to avoid conflicting uses of Ftemp register 360.

If the next instruction is determined to be an FCMOV-type instruction (step 522), then indicator bit is read (step 528) to determine whether it is set (step 530). If the indicator bit is not set, this indicates that an FCOMI-type instruction did not immediately precede the FCMOV-type instruction. In this case Ftemp register 360 is not used as a source for flag information. Instead, the source for the FCMOV-type instruction is left as the EFLAGS register (step 540). The EFLAGS register is read (step 542), and then the FCMOV-type instruction is scheduled and executed once the desired contents of the EFLAGS register have been received (step 544).

If, however, the indicator bit is set (step 530), the FCMOV-type instruction's source is changed from the EFLAGS register to the Ftemp register (step 532). The indicator bit may now be cleared (step 534), and the FCMOV-type instruction may be scheduled for execution as soon as Ftemp register 360 becomes valid (step 536). Finally, the FCMOV-type instruction executes using the flag values read from the Ftemp register in lieu of waiting for the flags from the EFLAGS register.

In some embodiments, the indicator bit need not be cleared as described in step 534. Since there may be multiple FCMOV-type instructions dependent upon on the same FCMOV-type instruction, clearing the bit at this time may unnecessarily decrease performance. Instead, the indicator bit be left in a "set" state to indicate that valid flag data is still stored in the Ftemp register. The indicator bit may be reset at a later time (e.g., when Ftemp is overwritten or deallocated).

Note the flowchart illustrated in the figure is for explanatory purposes and is not meant to be limiting. Depending upon the exact implementation, the steps may be performed in a different order and may be performed using a different number of clock cycles than shown in the figure. For example, the floating point unit may be configured to receive multiple instructions per clock cycle. Thus, the FCOMI-type instruction and the next instruction may be received in the same clock cycle. Similarly, steps 522–534 may be combined and may be performed in a single clock cycle. Additional steps may also be added. In some embodiments, the method described above may be implemented in hardware. In other embodiments, the method may be implemented in software (e.g., in microcode stored in MROM unit 34).

The exact implementation for this microcode may vary depending upon the design of the microprocessor. In some embodiments, the microcode may be implemented using a conditional move instruction. Conditional move instructions are typically three-input instructions (i.e., two multiplexer inputs and a control input to select one of the multiplexer inputs). However, some microprocessors/floating point units are not configured to handle instructions with more than two sources. This limitation may be overcome by performing two masking instructions and then logically ORing the results. For example, in one embodiment the following microcode sequence may be used:

| | | |
|---|---|---|
| fflg2cl | ft0,[FP_MEM_EMP] | ; read flags from emulation memory into ft0 |
| fselectb | ft1, ft0, sti | ; move sti to ft1 if cc true, else move zero to ft1 |
| fselectnb | ft2, ft0, st0 | ; move st0 to ft2 if cc false, else move zero to ft2 |
| fcombine | st0, ft1, ft2 | ; write non-zero source (i.e., ft1 or ft2) to st0 |

The nomenclature used above has the following meanings: "cc" refers to condition code; "ft0", "ft1", and "ft2" refer to temporary floating point registers; and "sti" and "st0" refer to stack locations. Note that this example is for explanatory purposes only and is not meant to be limiting. Depending upon the exact implementation and the configuration of the microprocessor, other microcode sequences are possible and contemplated.

As noted above, in some embodiments the detection of whether an FCMOV-type instruction immediately follows an FCOMI-type instruction may be performed earlier (i.e., outside the floating point unit). For example, early decode units 42–44 may be configured to detect when FCMOV-type instructions immediately follow FCOMI-type instructions. The early decode units may then set the indicator bit accordingly before the instructions are routed to floating point unit 36.

Figure 7:
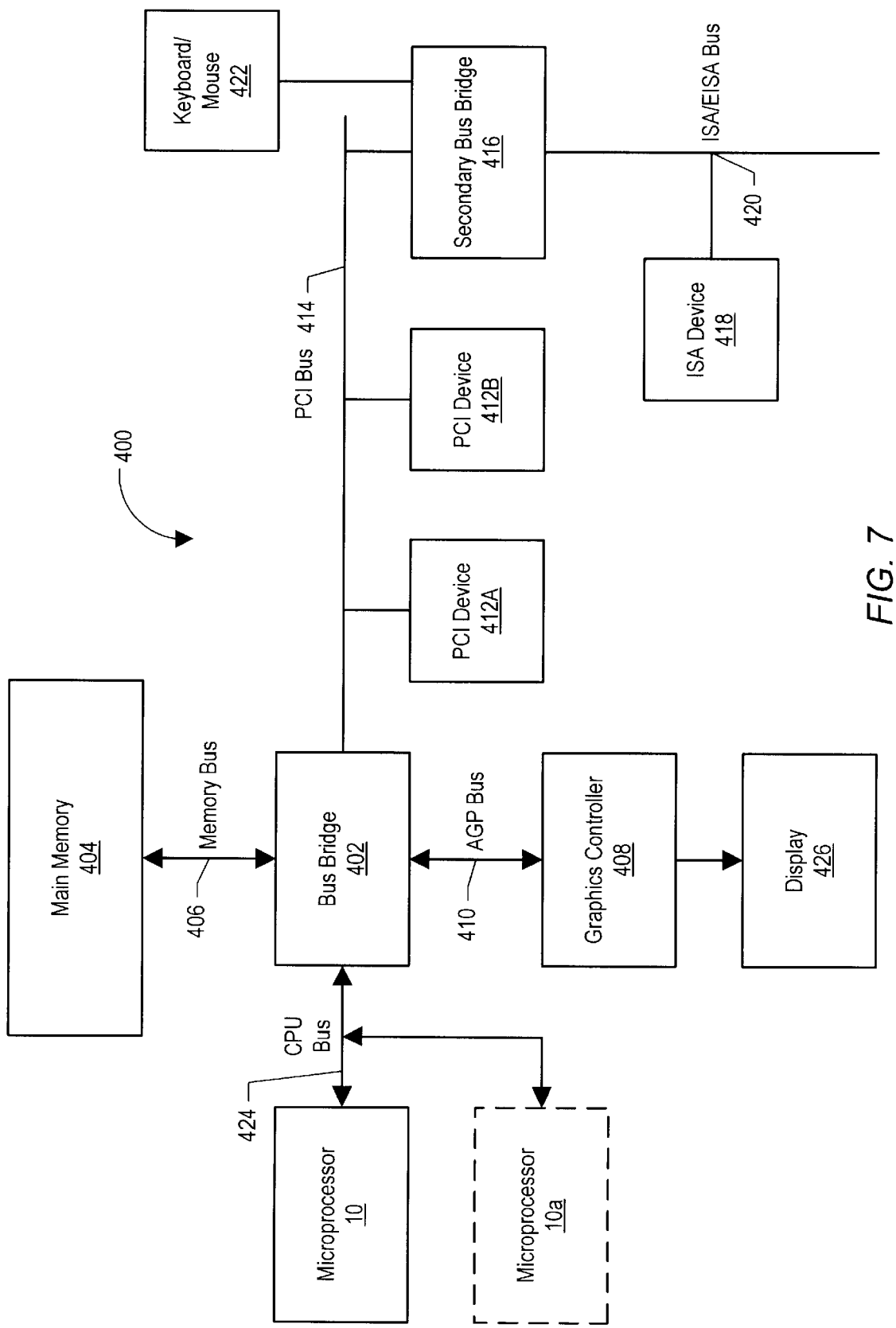
FIG. 7 is a block diagram of one embodiment of a computer system configured to utilize the microprocessor of FIG. 3.

Exemplary Computer System—FIG. 7

FIG. 7 shows a block diagram of one embodiment of a computer system 400 including microprocessor 10. Microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a communications device (e.g., a modem or a network card), a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g. microprocessor 10a shown as an optional component of computer system 400). Microprocessor 10a may be similar to microprocessor 10. More particularly, microprocessor 10a may be an identical copy of microprocessor 10. Microprocessor 10a may share CPU bus 424 with microprocessor 10 or may be connected to bus bridge 402 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A microprocessor comprising:
    an instruction cache configured to store floating point instructions and integer instructions; and
    a floating point unit coupled to receive the floating point instructions from the instruction cache, wherein the floating point unit comprises:
        a means for detecting floating point compare (FCOMI) type instructions and floating point conditional move (FCMOV) type instructions;
        a temporary register configured to store results from the FCOMI-type instructions; and
        a means for forcing FCMOV-type instructions that follow FCOMI-type instructions to use the temporary storage register as a source for flag information in lieu of an integer flag register.

2. The microprocessor as recited in claim 1, wherein the means for forcing is configured to refrain from forcing the FCMOV-type instructions to use the temporary register for flag information if one or more integer instructions occur between the FCMOV-type instructions and the FCOMI-type instructions.

3. The microprocessor as recited in claim 1, wherein the means for forcing is configured to refrain from forcing the FCMOV-type instructions to use the temporary register for flag information if one or more integer instructions that are capable of changing the integer flag register occur between the FCMOV-type instructions and the FCOMI-type instructions.

4. The microprocessor as recited in claim 1, wherein the means for forcing is configured to refrain from forcing the FCMOV-type instructions to use the temporary register for flag information if one or more instructions that also use the temporary register occur between the FCMOV-type instructions and the FCOMI-type instructions.

5. The microprocessor as recited in claim 1, wherein the means for detecting is further configured to set an indicator bit after detecting each FCOMI-type instruction, and wherein the means for detecting FCMOV-type instructions is further configured to clear the indicator bit after detecting each FCMOV-type instruction.

6. The microprocessor as recited in claim 5, wherein the means for detecting is further configured to clear the indicator bit upon detecting one or more integer instructions occurring between the FCMOV-type instructions and the FCOMI-type instructions in program order.

7. The microprocessor as recited in claim 5, wherein the means for detecting is further configured to clear the indicator bit upon detecting one or more instructions capable of changing the integer flag register occurring between the FCMOV-type instructions and the FCOMI-type instructions in program order.

8. The microprocessor as recited in claim 5, wherein the means for detecting is further configured to clear the indicator bit upon detecting one or more instructions that use the temporary register as a source occurring between the FCMOV-type instruction and the FCOMI-type instruction.

9. The microprocessor as recited in claim 1, wherein the means for forcing is configured to refrain from forcing the FCMOV-type instructions to use the temporary register for flag information if the indicator bit is not set when the FCMOV-type instructions are received by the floating point unit.

10. The microprocessor as recited in claim 5, wherein the floating point unit further comprises a scheduler configured to store and schedule for execution the floating point instructions received from the instruction cache, wherein the scheduler is configured to schedule the FCMOV-type instructions for execution only after a specified flag is received from the integer flag register if the indicator bit is not set.

11. The microprocessor as recited in claim 5, wherein the floating point unit further comprises a scheduler configured to store and schedule for execution a plurality of floating point instructions awaiting execution, wherein the scheduler is configured to schedule the FCMOV-type instructions for execution only after the temporary register is valid if the indicator bit is set.

12. The microprocessor as recited in claim 1, wherein the microprocessor is configured to execute x86 integer and floating point instructions, and wherein the FCOMI-type instructions are selected from the group comprising: FCOMI, FCOMIP, FUCOMI, and FUCOMIP instructions.

13. The microprocessor as recited in claim 1, wherein the means for detecting comprises an early instruction decode unit.

14. The microprocessor as recited in claim 1, wherein the means for forcing comprises a register rename unit.

15. A method comprising:
    storing the results of floating point compare (FCOMI) type instructions to a temporary register and an integer flag register; and
    assigning floating point conditional move (FCMOV) type instructions the temporary register as a source if the FCMOV-type instructions immediately follow FCOMI-type instructions.

16. The method as recited in claim 15, wherein a particular FCMOV-type instruction is said to immediately follow a particular FCOMI-type instruction if there are no integer instructions between the particular FCMOV-type instruction and the particular FCOMI-type instruction.

17. The method as recited in claim 15, wherein a particular FCMOV-type instruction is said to immediately follow a particular FCOMI-type instruction if (i) there are no integer instructions between the particular FCMOV-type instruction and the particular FCOMI-type instruction, (ii) there are no instructions between the particular FCMOV-type instruction and the particular FCOMI-type instruction that have an ability to change the integer flag register, and (iii) there are no instructions between the particular FCMOV-type instruction and the particular FCOMI-type instruction that have an ability to modify the temporary register.

18. A computer system comprising:
    a main memory;
    a communications device; and
    a microprocessor coupled to the main memory and the communications device, wherein the microprocessor comprises:
        an instruction cache configured to store floating point instructions and integer instructions; and
        a floating point unit coupled to receive the floating point instructions from the instruction cache, wherein the floating point unit comprises:
            a means for detecting floating point compare (FCOMI) type instructions and floating point conditional move (FCMOV) type instructions;
            a temporary register configured to store results from the FCOMI-type instructions; and
            a means for forcing FCMOV-type instructions that follow FCOMI-type instructions to use the temporary storage register as a source for flag information in lieu of an integer flag register.

19. The system as recited in claim 18, wherein the means for forcing is configured to refrain from forcing the FCMOV-type instructions to use the temporary register for flag information if one or more integer instructions occur between the FCMOV-type instructions and the FCOMI-type instructions.

20. The system as recited in claim 18, wherein the means for forcing is configured to refrain from forcing the FCMOV-type instructions to use the temporary register for flag information if one or more instructions that also use the temporary register occur between the FCMOV-type instructions and the FCOMI-type instructions.

* * * * *